Patented July 19, 1938

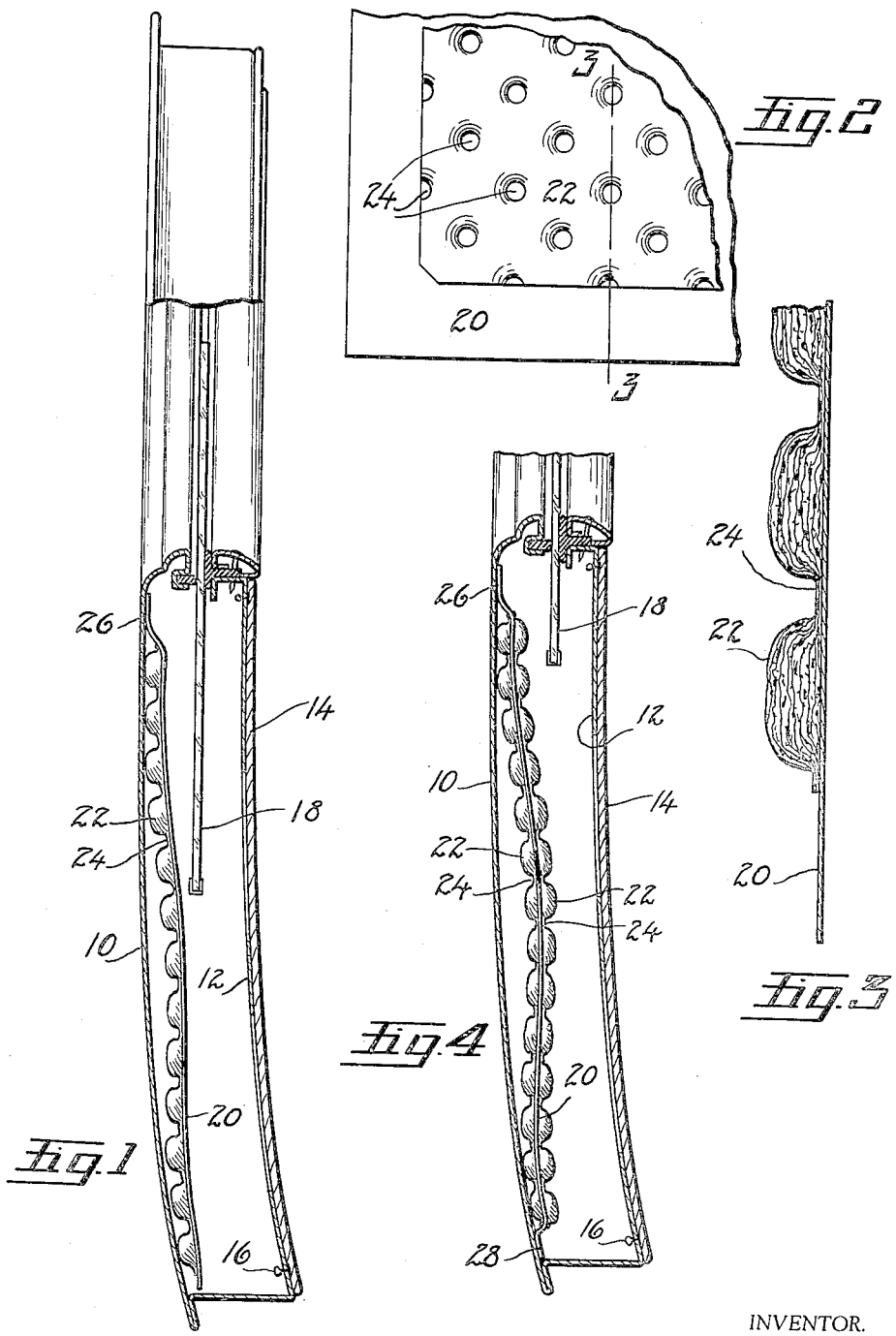

2,124,463

UNITED STATES PATENT OFFICE 2,124,463

SOUND INSULATION

George R. Cunnington, Detroit, Mich., assignor to Woodall Industries Incorporated, Detroit, Mich., a corporation of Michigan Application November 16, 1935, Serial No. 50,075

3 Claims. (Cl. 296—44)

My invention relates to improvements in sound insulation for vehicle bodies and particularly to closed automobile bodies.

Undesirable noises are found within the interior of closed automobile bodies as a result of many different causes. These noises may arise within the engine compartment or due to the travel of the vehicle over the road. They may enter the interior of the body either through the air or by means of mechanical transmission. Furthermore, travel of the vehicle will set up vibratory movements of the wall panels which give rise to audible air waves. In addition air waves set in motion by the vibration of one wall panel will strike other wall panels of the body and as a consequence be reflected or reinforced thereby to the aggravation and multiplication thereof whereby the sum total of the undesirable noise within the interior of the body is materially increased.

These noises possess widely varying characteristics. Some are of low pressure and high frequency. Others are of high pressure and low frequency. Different acoustical treatments are needed to minimize these different noises. The present type of automobile body with the large employment of metal wall panels and the large expanse of curved panel sections has increased the difficulty of effectively insulating the interior of the body.

My invention relates to the provision of an improved acoustical treatment for a vehicle body such as a closed automobile body. The purpose is to insulate the body against the production or propagation of undesirable noise.

A common form of wall structure for an automobile body is a frame provided with an external metal wall panel secured to the outer side thereof and a suitable trim panel of cardboard or other such material secured to the inner side thereof. Such panels, while relatively stiff and rigid are sufficiently flexible and resilient to set up vibrations productive of noise within the interior of the body. Various means have been employed to minimize this noise. One method of treatment has been to apply a plastic or other substance to one surface of the metal wall. Another method of treatment has been to adhesively apply sound absorbing or sound deadening material to one surface of the vibratory panel.

An object of my invention is to provide a sound insulation blanket or the like which is suspended within the space between said two wall panels in such a manner as to absorb and dissipate the sound waves striking the blanket minimizing the sound productive effect thereof so as to reduce the noise within the interior of the body.

Preferably this blanket comprises a flexible sheet of fluffy sound wave absorption material made up of a multiplicity of superimposed filmy fibrous layers wherein the several fibers extend parallel to the plane of the sheet. Specifically there is associated with this layer of fluffy material a substantially imperforate layer of material which is flexible relatively non resilient and inert and adapted to dissipate the sound waves striking the same.

The above objects, advantages and meritorious features of my invention will more fully appear from the following description, appended claims, and accompanying drawing, wherein:

Figure 1 is a cross-sectional view through the window well structure of an automobile body door showing an embodiment of my invention, Fig. 2 is an elevation of a fragment of a sheet of improved insulation material suitable to be employed, Fig. 3 is a sectional view taken on line 3—3 of Fig. 2, and Fig. 4 is a sectional view through a window well portion of an automobile body wall showing a modified form of my invention.

As hereinabove set forth many undesirable noises are produced within the interior of closed automobile bodies by vibration caused by travel of the car over the road or from noises arising within the engine compartment and with the types of bodies that are now coming into use wherein the expanse of metal panels is substantially increased such noises have been aggravated to a point of substantial disturbance to the occupants in the vehicle.

Many methods of acoustical treatment have been employed to minimize these noises. The particular treatment herein set forth includes the provision of a sound absorbing and sound deadening and dissipating flexible composition blanket interposed within the wall structure of the vehicle body between the inner and outer panel sections. Specifically it is shown in the drawing as located in the window well which is one of the large side panel portions of a closed body. Obviously it would be suspended in a similar manner within any wall portion between the inner and outer panels. The outer panel section of an automobile body is almost universally formed of metal.

In the embodiment of my invention here illustrated the outer metal panel is indicated by the numeral 10. A suitable supporting framework 12 is provided which carries an inner trim panel 14. The common practice is to provide such an inner trim panel of suitable fibrous material which, while sufficiently flexible to conform to the curvature of its support, is of a relatively stiff and self supporting character. It may be held in place by suitable securing devices 16 of any desired character and it may or may not be covered with a trim fabric and wadding. The window is indicated by the numeral 18. Suitable window actuating mechanism would be provided to raise and lower the window. This forms no part of the present invention and is not illustrated.

It will be seen that this hollow wall is made up of a resilient vibratory outer metal panel 10 and a relatively stiff inner panel 14 which would respond to vibration set up whether through its mechanical supports or under impact of a column of air. I have found that by loosely suspending a sound absorbing and sound dissipating blanket or the like within the space between these two panels that the resultant noise produced within the automobile body is materially minimized. I prefer to employ an acoustical treatment which makes use of a flexible sheet of sound absorbing material of different characteristics.

In the construction shown I employ an insulation sheet such as is illustrated and claimed per se in my copending application Serial No. 46,725, filed October 25, 1935, and which comprises a foundation layer 20 of relatively dense flexible fibrous material of an inert character. As described in the copending application supra such layer may be formed of multi-ply creped paper carrying an asphaltum content which renders the same substantially dead and inert to vibration impulses and which is substantially impervious to air passage.

There is secured to one side of this supporting layer a lamination of wadding or other loosely integrated fibrous material. In the construction here shown and more particularly claimed in my copending case this layer of sound absorbing wadding consists of a plurality of filmy plies of loosely integrated fibrous material. These several plies are arranged one above the other so as to produce a very loosely integrated relatively thick sound absorbing layer 22 which may be compacted as at 24 and adhesively secured to the foundation layer 20 at such points.

In the construction shown this foundation layer is adhesively or otherwise suitably secured along its upper margin to the metal panel as at 26. In the embodiment shown in Fig. 1 this insulation sheet hangs loose within the space between the inner and outer wall panels and the sound absorbing layer 22 of such sheet is arranged adjacent to the metal layer so as to absorb the sound vibrations created thereby. The relatively dense inert impervious foundation layer 20 serves to dissipate and deaden the sound waves striking the same.

In the construction of Fig. 4 a sound absorbing layer 22 is arranged on each side of the foundation layer 20 and adhesively secured thereto and in addition the foundation layer is not only secured at the top as at 26 to the metal panel but is secured at the bottom as at 28 thereto but such securement is so arranged that the insulation layer hangs loosely in place.

What I claim:

1. A vehicle body wall comprising, in combination, a relatively stiff resilient outer metal panel, a relatively stiff inner trim panel supported in spaced apart relationship with respect to the outer metal panel, and a flexible sheet of sound insulation material comprising a layer of porous fluffy loosely integrated fibrous material carried by a foundation layer of flexible imperforate inert fibrous material suspended within the space between said outer and said inner panels to hang freely within said space.

2. A vehicle body wall comprising an outer metal panel, an inner trim panel supported in spaced apart relationship with respect to the outer panel, a sheet of sound insulating material suspended to hang freely within the space between said two panels and comprising a flexible layer of loosely integrated sound absorption fibrous composition material carried by a layer of relatively dense inert fibrous composition material with the loosely integrated layer juxtaposing the metal panel.

3. A vehicle body wall comprising an outer metal panel, an inner trim panel supported in spaced apart relationship with respect to the outer panel, a sheet of sound insulating material suspended to hang freely within the space between said two panels and comprising a layer of relatively dense flexible inert fibrous composition material having a layer of loosely integrated fluffy sound absorption fibrous material secured to each side thereof.

GEORGE R. CUNNINGTON.